(12) United States Patent
Fujita

(10) Patent No.: US 7,440,111 B2
(45) Date of Patent: Oct. 21, 2008

(54) CONFOCAL MICROSCOPE APPARATUS

(75) Inventor: Hiroshi Fujita, Saitama (JP)

(73) Assignee: FUJINON Corporation, Saitama-ken (JP)

( * ) Notice: Subject to any disclaimer, the term of this patent is extended or adjusted under 35 U.S.C. 154(b) by 52 days.

(21) Appl. No.: 11/524,265

(22) Filed: Sep. 21, 2006

(65) Prior Publication Data

US 2007/0064238 A1    Mar. 22, 2007

(30) Foreign Application Priority Data

Sep. 22, 2005   (JP)   ............................. 2005-275332

(51) Int. Cl.
  *G01B 9/02*   (2006.01)
(52) U.S. Cl. .................................... 356/479
(58) Field of Classification Search ................ 356/477, 356/479, 484, 497; 250/221.19, 227.27; 385/12
  See application file for complete search history.

(56) References Cited

U.S. PATENT DOCUMENTS

| | | | | |
|---|---|---|---|---|
| 5,563,967 | A * | 10/1996 | Haake | 385/12 |
| 6,069,698 | A * | 5/2000 | Ozawa et al. | 356/511 |
| 6,151,127 | A | 11/2000 | Kempe | |
| 6,654,127 | B2 * | 11/2003 | Everett et al. | 356/479 |
| 7,023,558 | B2 * | 4/2006 | Fee et al. | 356/479 |
| 7,180,600 | B2 * | 4/2006 | Horii et al. | 356/479 |
| 2004/0254474 | A1 * | 12/2004 | Seibel et al. | 600/473 |

FOREIGN PATENT DOCUMENTS

WO    WO-98/52021 A1    11/1998

OTHER PUBLICATIONS

Rollins et al. Optics Express, Sep. 14, 1998, pp. 219-229, vol. 3, No. 6.

* cited by examiner

*Primary Examiner*—Michael A Lyons
(74) *Attorney, Agent, or Firm*—Birch, Stewart, Kolasch & Birch, LLP

(57) ABSTRACT

A confocal microscope apparatus capable of rapidly obtaining a tomographic image using OCT measuring. The confocal microscope apparatus for obtaining a tomographic image of a measuring object includes a light modulating section that modulates the frequency of the reference light. The light modulating section includes: a diffraction grating element for dispersing the reference light; a collimator lens for collimating the reference light dispersed by the diffraction grating element; and a reflection mirror for reflecting the reference light transmitted through the collimator lens back to the collimator lens and inputting to the diffraction grating element. The reflection mirror is pivoted on a position which is offset from the optical axis of the collimator lens.

4 Claims, 4 Drawing Sheets

CONFOCAL MICROSCOPE APPARATUS

BACKGROUND OF THE INVENTION

1. Field of the Invention

The present invention relates to a confocal microscope apparatus for obtaining an image of a measuring object at a predetermined depth. More specifically, the present invention relates to a confocal microscope apparatus for obtaining an image of a measuring object at a predetermined depth using OCT (optical coherence tomography) measuring.

2. Description of the Related Art

It is known that confocal microscope apparatuses are used for performing endoscopic examinations of the inside of human bodies. One such apparatus that employs the principle of OCT measuring using heterodyne detection and the principle of confocal microscope is proposed as described, for example, in U.S. Pat. No. 6,151,127. In the confocal microscope apparatus disclosed in U.S. Pat. No. 6,151,127, laser light outputted from the light source is split into measuring light and reference light, and the reference light is inputted to a reference mirror that moves in the optical axis directions, thereby the frequency of the reference light is modulated.

In the mean time, the measuring light is guided to the measuring object using an optical fiber, and the measuring light outputted from the optical fiber is focused on the measuring object by a condenser lens. Here, the measuring light output section of the optical fiber and the focal position on the measuring object are in confocal relationship, thereby the reflected light reflected from the measuring object other than the focal position is prevented from entering the optical fiber.

Thereafter, the interference light between frequency-modulated reference light and the reflected light reflected from the measuring object guided by the optical fiber is heterodyne detected, and the reflection information from the focal position is obtained. By moving the focal position of the condenser lens in the directions orthogonal to the depth direction of the measuring object, a tomographic image of the object at a predetermined depth is obtained.

Here, when performing the heterodyne detection, it is necessary to move or vibrate the reference mirror to differentiate the frequency between the measuring light and reference light. When the reference mirror is moved or vibrated, however, the heterodyne detection is also performed for the measuring object in the depth direction. Consequently, when obtaining a tomographic image at a predetermined depth as in the confocal microscope apparatus described above, the interference light is not detectable unless the optical path length of the reference light corresponds to the optical path length of the measuring light to the focal position of the condenser lens when the reference mirror is moved. This causes a problem of time redundancy when obtaining a tomographic image.

In view of the circumstances described above, it is an object of the present invention to provide a confocal microscope apparatus capable of rapidly obtaining a tomographic image using OCT measuring.

SUMMARY OF THE INVENTION

The confocal microscope apparatus of the present invention is an apparatus for obtaining an image of a measuring object at a predetermined depth, comprising:

a light source unit for outputting light;

a light splitting means for splitting the light outputted from the light source unit into measuring light and reference light;

a light modulating section for producing a frequency difference between the measuring light and reference light split by the light splitting means;

a confocal optical system for focusing the measuring light split by the light splitting means on the measuring object, and focusing reflected light reflected from the measuring object when the measuring light is focused thereon;

a light combining means for combining the reflected light focused by the confocal optical system with the reference light;

an interference light detecting means for detecting interference light produced when the reflected light and reference light combined by the light combining means interfere with each other; and an image obtaining means for obtaining an image of the measuring object at a predetermined depth based on the interference light detected by the interference light detecting means, wherein the light modulating section comprises:

a diffraction grating element for dispersing the reference light split by the light splitting means;

a collimator lens for collimating the reference light dispersed by the diffraction grating element;

a reflection mirror for reflecting the reference light transmitted through the collimator lens back to the collimator lens and inputting to diffraction grating element, the reflection mirror pivoting on a position which is offset from the optical axis of the collimator lens; and a mirror for reflecting the reference light inputted to the diffraction grating element by the reflection mirror and dispersed from the diffraction grating element back to the diffraction grating element.

Here, the reflection mirror is pivoted such that the frequency of the reference light outputted from the light modulating section is changed without changing the optical path length thereof. Preferably, the reflection mirror is pivoted such that the relationship represented by the following formula is satisfied, $x=l_f \lambda_0/p$, where: $\lambda_0$ is the wavelength of the reference light; $l_f$ is the distance between the collimator lens and the reflection mirror; p is the pitch of the diffraction grating element; and x is the offset distance between the optical axis of the collimator lens and the pivot center when the reflection mirror is pivoted.

Preferably, the reflection mirror is pivoted at a constant speed. Here, the image obtaining means may include a bandpass filter for passing only a signal having a frequency of the interference light determined by the pivoting speed of the reflection mirror in the interference light detected by the interference light detecting means.

Further, the confocal optical system may have any structure. For example, it may include a light output section constituted by an optical fiber for guiding the measuring light from the light splitting means to the measuring object, and a condenser lens for focusing the measuring light outputted from the light outputting section on the measuring object.

According to the confocal microscope apparatus of the present invention, the light modulating section includes: a diffraction grating element for spectrally dispersing the reference light split by the light splitting means; a collimator lens for collimating the reference light dispersed by the diffraction grating element; a reflection mirror for reflecting the reference light transmitted through the collimator lens back to the collimator lens and inputting to the diffraction grating element, reflection mirror pivoting on a position offset from the optical axis of the collimator lens; and a mirror for reflecting the reference light inputted to the diffraction grating element by the reflection mirror and dispersed from the diffraction grating element back to the diffraction grating element. This allows the frequency of the reference light to be modulated rapidly without changing the optical path length thereof, thereby the tomographic image obtaining speed may be improved.

If a configuration is adopted in which the reflection mirror is pivoted such that the relationship represented by the formula, $x=l_f \lambda_0/p$ is satisfied, where: $\lambda_0$ is the wavelength of the reference light, $I_f$ is the distance between the collimator lens and the reflection mirror, p is the pitch of the diffraction grating element, and x is the offset distance between the pivot center when the reflection mirror is pivoted and the optical axis of the collimator lens, the frequency of the reference light outputted from the light modulating section may be modulated rapidly without changing the optical path length thereof. This may improve the tomographic image obtaining speed.

Further, if a configuration is adopted in which the reflection mirror is pivoted at a constant speed; and the image obtaining means includes a bandpass filter for passing only a signal having a frequency of the interference light determined by the pivoting speed of the reflection mirror in the interference light detected by the interference light detecting means, only the interference light of the indented measuring region is securely detected. Thus, the image with a greater S/N ratio having less noise may be obtained compared with the image obtained by the conventional confocal microscope apparatus.

DESCRIPTION OF THE PREFERRED EMBODIMENTS

Figure 1:
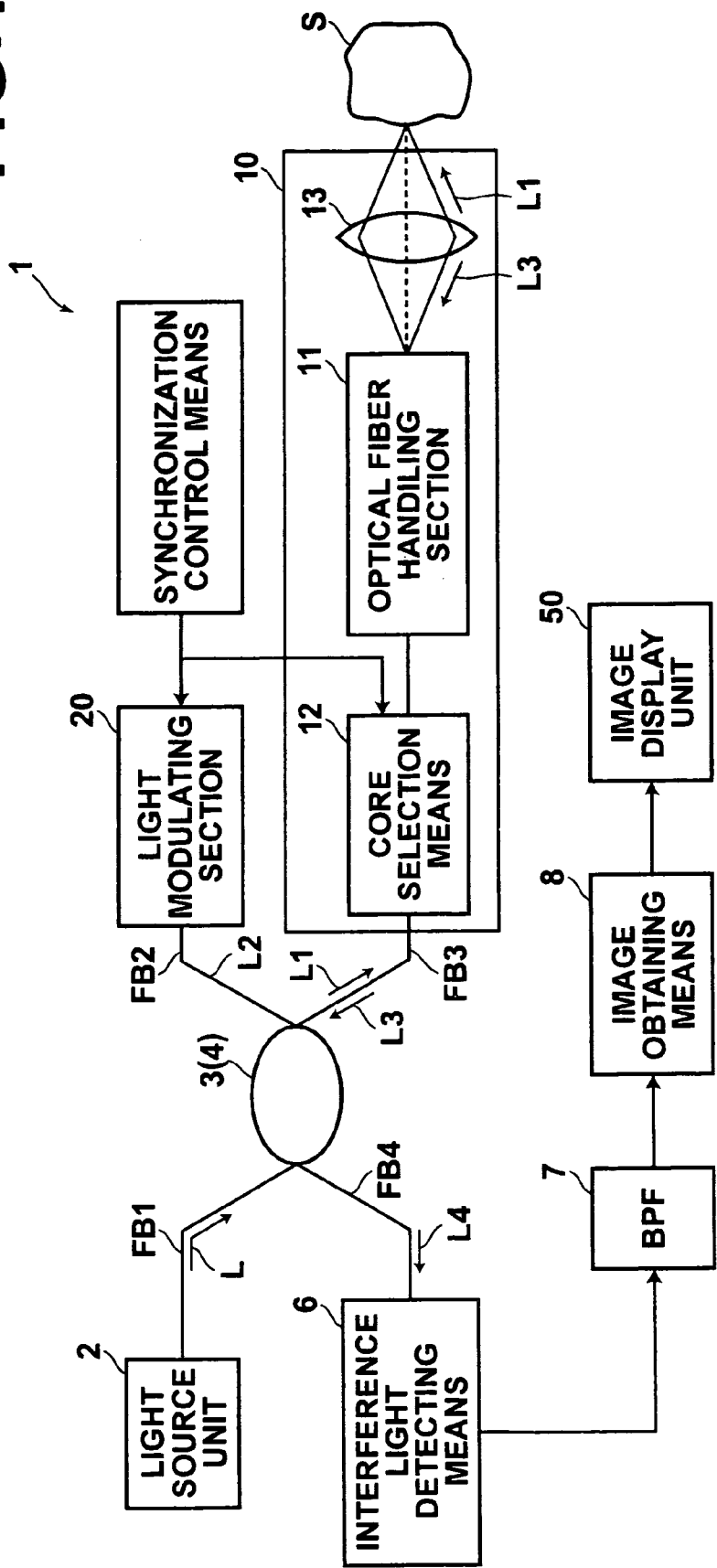
FIG. 1 is a schematic view of an exemplary embodiment of the confocal microscope apparatus of the present invention, illustrating the construction thereof.

Hereinafter, an exemplary embodiment of the confocal microscope apparatus of the present invention will be described in detail with reference to the accompanying drawings. FIG. 1 is a schematic view of an exemplary embodiment of the confocal microscope apparatus of the present invention, illustrating the construction thereof. The confocal microscope apparatus 1 is an apparatus that uses OCT (Optical Coherence Tomography) measuring. The apparatus 1 includes: a light source unit 2 for outputting light; a light splitting means 3 for splitting light L outputted from the light source unit 2 into measuring light L1 and reference light L2; a light modulating section 20 for modulating the frequency of the reference light L2 split by the light splitting means 3; and a confocal optical system 10 for focusing the measuring light L1 split by the light splitting means on a measuring object S, and focusing reflected light L3 reflected from the measuring object S. The apparatus 1 further includes: a light combining means 4 for combining the reference light L2 frequency-modulated by the light modulating section 20 with the reflected light L3 focused by the confocal optical system 10; a interference light detecting means 6 for detecting interference light L4 when the reference light L2 and reflected light L3 combined by the light combining means 4 interfere with each other; and an image obtaining means 8 for obtaining an image of the measuring object S at a predetermined depth from the interference light L4 detected by the interference light detecting means 6.

Here, the light source unit 2 is constituted, for example, by SLD (Super Luminescent Diode) that emits low coherence light having a broadband spectrum, and the light outputted from the light source unit 2 is inputted to an optical fiber FB1. The light splitting means 3 is constituted, for example, by an optical fiber coupler and has the function to split the light L transmitted through the optical fiber FB1 into the measuring light L1 and reference light L2. Here, the measuring light L1 is outputted to an optical fiber FB3, and the reference light is outputted to an optical fiber FB 2. The optical fiber coupler 3 also acts as the light combining means 4 for combining the reflected light L3 reflected from the measuring object S with the reference light L2.

The measuring light L1 propagated through the optical fiber FB3 is irradiated on the measuring object S through the confocal optical system 10. The confocal optical system 10 focuses the measuring light L1 split by the light splitting means 3 on the measuring object S, and focuses the reflected light reflected from the measuring object S. The confocal optical system 10 includes an optical fiber handling section 11, and a condenser lens 13 for focusing the measuring light L1 outputted from a core 11C (FIG. 2) of the optical fiber handling section 11 on the measuring object S.

Figure 2:
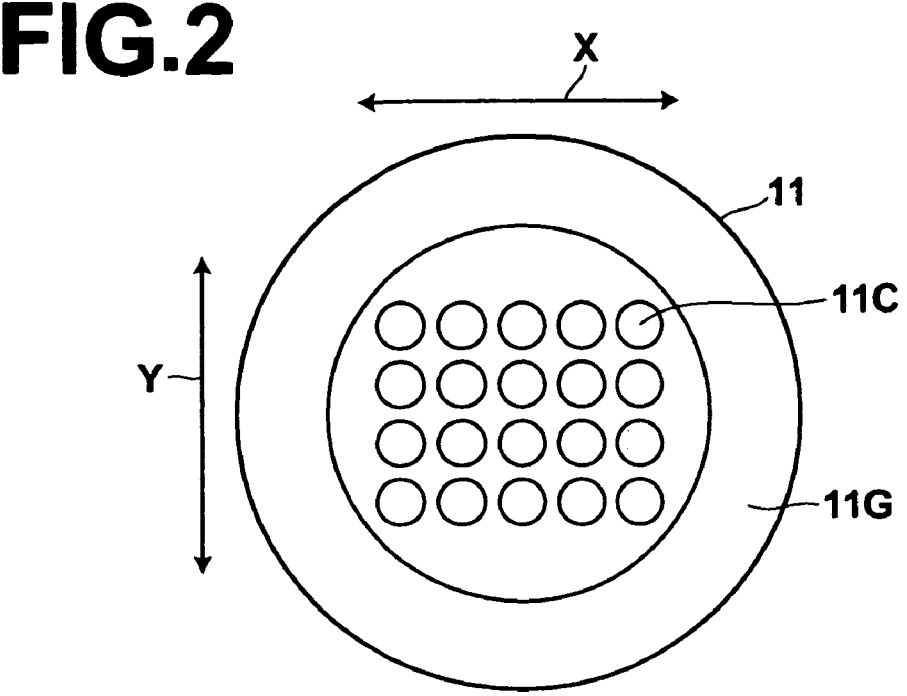
FIG. 2 is a schematic view of an example optical fiber used in the confocal microscope apparatus shown in FIG. 1, illustrating the construction thereof.

FIG. 2 is a schematic view of an example optical fiber handling section 11, which is a multicore optical fiber having a plurality of cores 11C in the clad 11G. A core selection means 12 is connected between the optical fiber FB3 and the optical fiber handling section 11. The core selection means 12 has the function to select a core for guiding the measuring light L1 propagated through the optical fiber FB3. In particular, the core selection means 12 is constructed such that the scanning in the arrow X directions (main scanning directions) for core selection is repeated in the arrow Y directions (sub-scanning directions). Selection of the core 11C in the arrows X and Y directions in the manner as described above allows the reflected light L3 reflected from the X-Y plane at a predetermined dept z of the measuring object S to be obtained.

The condenser lens 13 shown in FIG. 1 is arranged such that the measuring light L1 outputted from each core 11C is focused on the measuring object S, and the reflected light L3 reflected from the measuring object S is focused on each core 11C. Here, only the reflected light L3 reflected from the focal position of the measuring object S is inputted to each core 11C, and the reflected light L3 reflected from other areas than the focal position is not inputted thereto. Consequently, only the reflected light L3 reflected from the dept position within the measuring object S where the focal position of the condenser lens 13 is formed is inputted to each core 11C.

The light combining means 4 is constituted by a beam splitter which also acts as the light splitting means 3. It combines the reference light L2 frequency-modulated by the light modulating section 20 with the reflected light L3 reflected from the measuring object S, and outputs the combined light to the interference light detecting means 6.

The interference light detecting means 6 detects interference light L4 between the reflected light L3 and the reference light L2 combined by the light combining means 4, and the image obtaining means 8 obtains a tomographic image of the measuring object S based on the frequency and intensity of the interference light L4 detected by the interference light detecting means 6.

Figure 3:
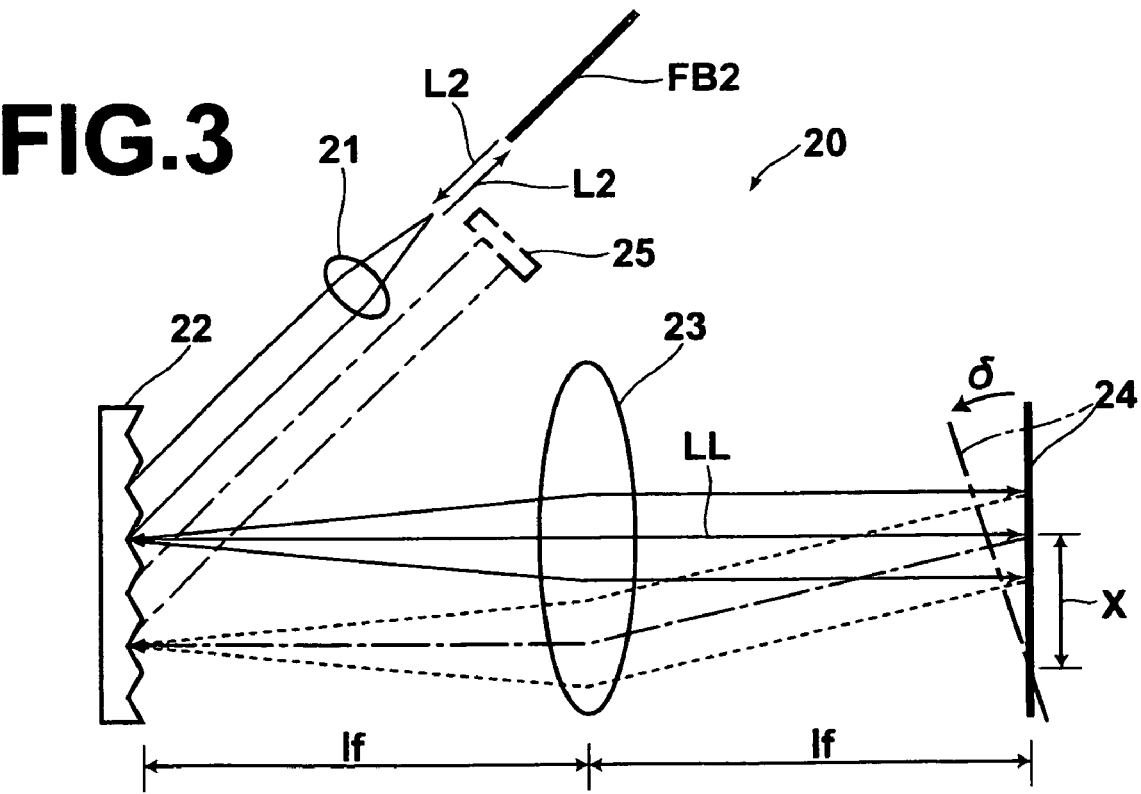
FIG. 3 is a schematic view of an example light modulating section of the confocal microscope apparatus shown in FIG. 1, illustrating the construction thereof.

FIG. 3 is a schematic view of an example light modulating section 20. Hereinafter, the light modulating section 20 will be described with reference to FIGS. 1 and 3. The light modulating section 20 is a light modulating section called RSOD (Rapid Scanning Optical Delay Line). The principle of RSOD is described in detail in the literature entitled "In vivo video rate optical coherence tomography" by Andrew M. Rollins, Manish D. Kulkarni, Siavash Yazdanfar, Tujchai Ung-arunyawee, and Joseph A. Izatt, Opt. Express 6, 219-229

(1998) (hereinafter, referred to as RSOD literature), and International Application Publication No. WO98/52021. The light modulating section 20 modulates the frequency of the reference light without changing the optical path length thereof, and is constituted by the RSOD. More specifically, the light modulating section 20 includes: a diffraction grating element 22 for spectrally dispersing the reference light L2; a collimator lens 23 for collimating the reference light L2 dispersed by the diffraction grating element 22; a reflection mirror 24 for reflecting the reference light L2 collimated by the collimator lens 23 back to the collimator lens 23; and a mirror 25 for reflecting the reference light L2 inputted to the diffraction grating element 22 from the reflection mirror 24 and dispersed from the diffraction grating element 22 back to the diffraction grating element 22.

The diffraction grating element 22 spectrally disperses the reference light L2 inputted from the optical fiber FB2 through the collimator lens 21 at a predetermined angle to the collimator lens 23. The collimator lens 23 is constituted, for example, by a Fourier transform lens, and has the function to collimate the reference light L2 dispersed by the diffraction grating 22.

The reflection mirror 24 is disposed at a position away from the collimator lens 23 by the distance corresponding to the focal length $I_f$ of the collimator lens 23. The reflection mirror 24 is pivoted rapidly in the arrow σ direction on a position which is offset from the optical axis LL of the collimator lens 23. This causes the frequency of the reference light L2 to be modulated by the Doppler shift, and the frequency-shifted reference light L2 is inputted back to the optical fiber FB2.

That is, the reference light L2 is propagated to the reflection mirror 24 through the diffraction grating element 22 and collimator lens 23, then from the reflection mirror 24 to the mirror 25 through the collimator lens 23 and diffraction grating element 22. Further, the reference light L2 is reflected from the mirror 25 and propagated to the reflection mirror 24 through the diffraction grating element 22 and collimator lens 23, then from the reflection mirror 24 to the optical fiber FB2 through the collimator lens 23 and diffraction grating element 22.

Hereinafter, exemplary operation of the confocal microscope apparatus 1 will be described with reference to FIGS. 1 to 3. When broadband low coherence light L is outputted from the light source unit 2, the low coherence light L is split into the measuring light L1 and reference light L2 by the light splitting means 3. The reference light L2 is frequency-shifted by the light modulating section 20, while the measuring light L1 is guided into the body cavity by the probe 20 and irradiated on the measuring object S. Then, the reflected light L3 reflected from the measuring object S and the reference light L2 are combined, and the interference light L4 between the reflected light L3 and the reference light L2 is detected by the interference light detecting means 6 as a beat signal. Based on the detected interference light L4, the image (tomographic image) of the measuring object S at a predetermined depth is obtained by the image obtaining means 8.

Here, the reflection mirror 24 is operated not to cause an optical delay (change in the optical path length) to the reference light L2. More specifically, the reflection mirror 24 is pivoted such that the offset distance x between the optical axis LL of the collimator lens 23 and the pivot center satisfies the relationship represented by the formula, $x = I_f \lambda_0 / p$, where: $\lambda_0$ is the center wavelength of the reference light L2, $I_f$ is the distance between the collimator lens 23 and the reflection mirror 24, and p is the pitch of the diffraction grating element.

That is, the amount of optical delay $\Delta I_g$ caused by pivoting the reflection mirror 24 in the light modulating section 20 is expressed as:

$$\Delta I_g = 4x - 4\sigma I_f \lambda_0 / p \quad (1)$$

Here, σ is a tilt amount of the reflection mirror 24. Thus, in order to make the amount of optical delay $\Delta I_g$ zero, it is evident from the Formula (1) above that all that is required is to pivot the reflection mirror 24 on the position that satisfies the relationship of x (offset distance from the optical axis LL)=$I_f \lambda_0 / p$.

As described above, the use in the light modulating section 20 of RSOD that modulates the frequency of the reference light L2 without changing the optical path length thereof allows rapid frequency shifting, thereby a tomographic image may be obtained rapidly. That is, in the conventional confocal microscope apparatus using OCT measuring, when the reference mirror is moved for frequency shifting, the optical path length is also changed at the same time. Consequently, adjustment of the focal position of the collimator lens 13 is required according to the change in the optical path length caused by the movement of the reference mirror, requiring longer time for obtaining the tomographic image. In contrast, the light modulating section 20 shown in FIG. 3 may perform frequency shifting without changing the optical path length of the reference light. This eliminates the adjustment of the focal position of the collimator lens 13 according to the change in the optical path length of the reference light L2, so that the tomographic image may be obtained rapidly.

Further, the center frequency $f_0$ and the amount of frequency shift $\Delta f$ may be express as in the following.

$$f_0 = 4x / \lambda_0 \times \delta\sigma(t)/\delta t \quad (2)$$

$$\Delta f = 2 \Delta\lambda / \lambda_0^2 (2x - 2I_f \lambda_0 / p) \times \delta\sigma(t)/\delta t \quad (3)$$

Here, when the reflection mirror 24 is pivoted at a constant speed $\omega (= \delta\sigma(t)/\delta t)$, the center frequency $f_0 = 4x\omega / \lambda_0$ from Formula (2). Further, if the offset distance $x = I_f \lambda_0 / p$ is substituted to Formula (3), $\Delta f$ becomes zero. That is, if the reflection mirror 24 is pivoted on the position that satisfies the relationship $x = I_f \lambda_0 / p$ at a constant speed, then the reference light L2 having a constant frequency $fm = 4x\omega / \lambda_0 = 4\omega I_f / p$ is outputted.

Accordingly, the differential frequency between the frequency f of the measuring light L1 and the frequency fm of the reference light L2 is constant. Thus, all that is required of the interference light detecting means 6 is to obtain the beat signal having the differential frequency. Consequently, as shown in FIG. 1, the image obtaining means 8 may include a bandpass filter 7 for passing only a signal having a frequency of the interference light L4 determined by the pivoting speed of the reflection mirror 24 in the interference light L4 detected by the interference light detecting means 6. This may eliminate signals having frequencies other than the differential frequency, so that the image obtained by the confocal microscope apparatus of the present embodiment has a greater S/N ratio than the image obtained by the conventional confocal microscope apparatus. In theory, the bandwidth of the bandpass filter 7 may be made zero, and a bandpass filter having the narrowest bandwidth achievable may be used as the bandpass filter 7.

Figure 4:
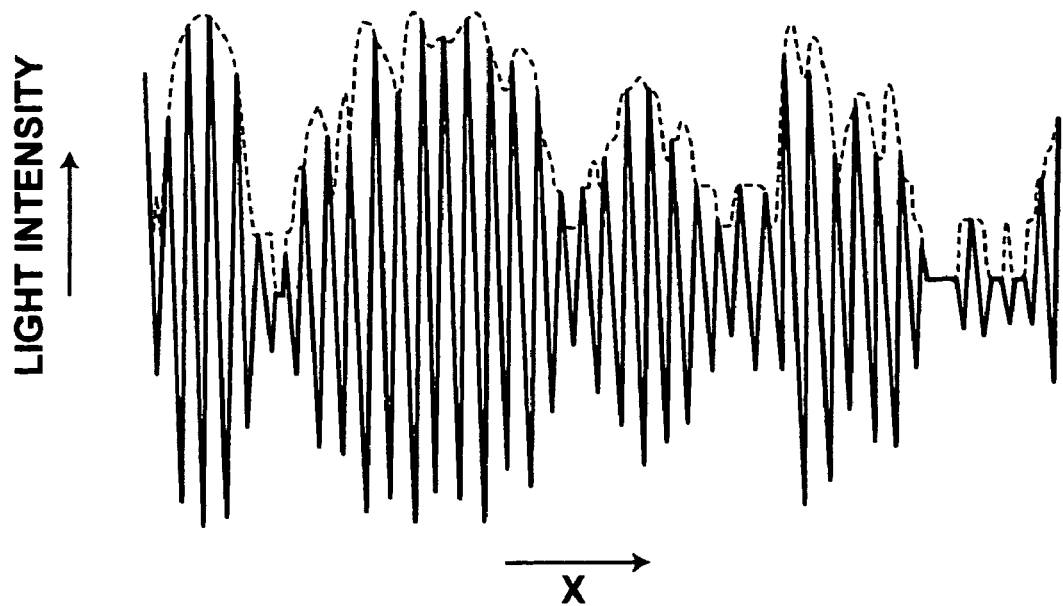
FIG. 4 is a drawing illustrating the waveform of the interference light obtained by the confocal microscope apparatus shown in FIG. 1.
Figure 5:
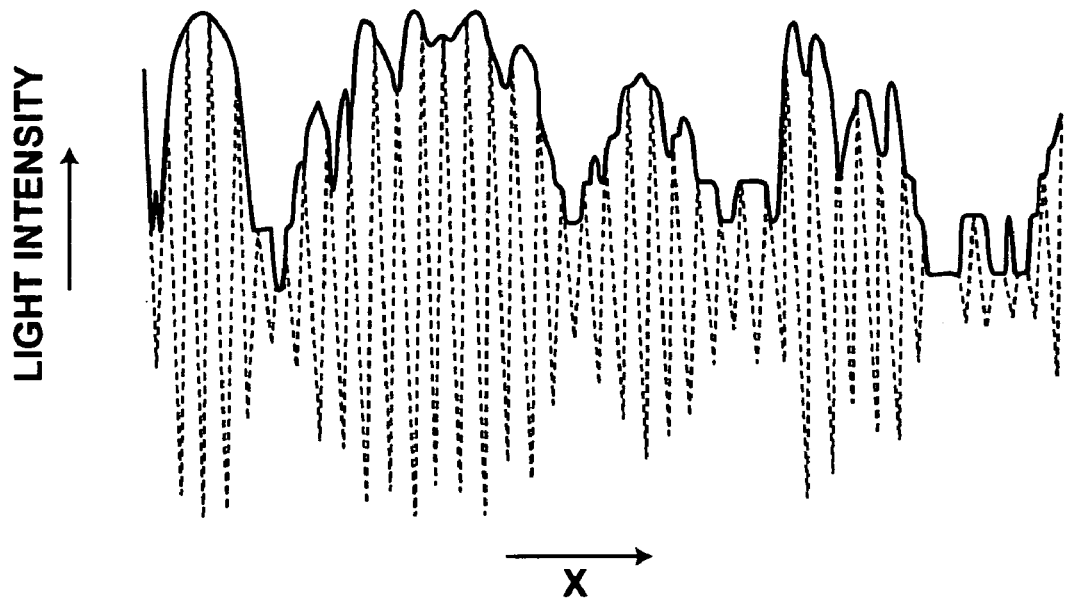
FIG. 5 is a drawing illustrating the waveform of the interference light obtained by the conventional confocal microscope apparatus.

More specifically, the use of the bandpass filter 7 constituted by the aforementioned bandpass filter allows the peaks of the interference light L4 to be detected sharply as illustrated by the solid line in FIG. 4, thereby a sharp tomographic image may be obtained. In contrast, in the conventional confocal microscope apparatus, an envelope like interference light, in which adjacent peaks are combined as illustrated by the solid line in FIG. 5, is detected as the interference light L4, thereby the image quality is degraded. That is, the image with a favorable S/N ratio may be obtained by keeping the differential frequency constant between the frequency of the measuring light L1 and the frequency of the reference light L2, and using the bandpass filter 7 having a next to zero bandwidth.

Figure 6A:
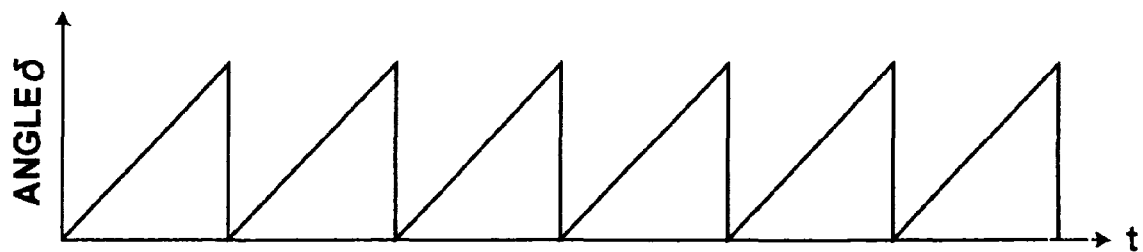
FIGS. 6A and 6B are graphs illustrating the synchronization of core selection with scanning of reflection mirror.
Figure 6B:
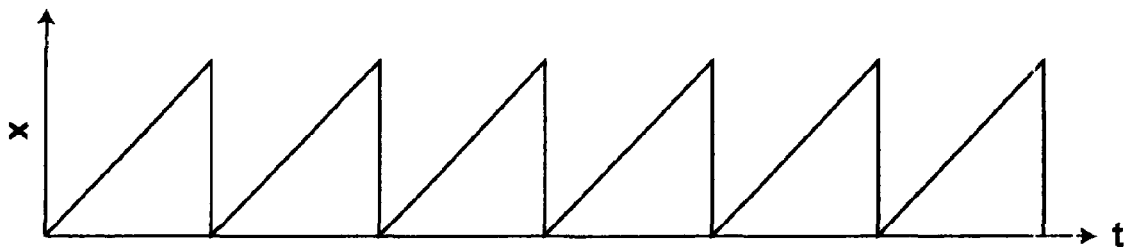

The light modulating section 20 and the core selection means 12 are controlled by a synchronization control means, and the movement of the reflection mirror 24 illustrated in FIG. 6A, and the selection of the core 11C by the core selection means 12 illustrated in FIG. 6B are scanned galvanically in synchronization. That is, while the reflection mirror 24 is tilted, the core selection means 12 scans in the arrow x direction for the selection of the core 11C. This may prevent degradation in the image quality due to the reflection mirror 24 returning to δ=0 degree, while the core selection means 12 is scanning in the arrow x direction for the selection of the core 11C.

According to the embodiment described above, the light modulating section 20 includes: the diffraction grating element 22 for spectrally dispersing the reference light L2 split by the light splitting means 3; the collimator lens 23 for collimating the reference light L2 dispersed by the diffraction grating element 22; and the reflection mirror 24 for reflecting the reference light L2 transmitted through the collimator lens 23 back to the collimator lens 23. This arrangement allows rapid frequency shifting of the reference light L2 without changing the optical path length thereof, so that the tomographic image obtaining speed may be improved.

If a configuration is adopted in which the reflection mirror 24 is pivoted such that the relationship represented by the formula, $x = I_f \lambda_0 / p$ is satisfied, where: $\lambda_0$ is the wavelength of the reference light, $I_f$ is the distance between the Fourier transform lens and the reflection mirror 24, p is the pitch of the diffraction grating element, and x is the offset distance between the pivot center of the reflection mirror and the optical axis of the Fourier lens, the reference light L2 outputted from the light modulating section 20 may be frequency-shifted without changing the optical path length thereof. This may improve the tomographic image obtaining speed.

Further, if a configuration is adopted in which the reflection mirror is pivoted at a constant speed, and the image obtaining means includes a bandpass filter for passing only a signal having a frequency corresponding to the frequency of the interference light determined by the pivoting speed of the reflection mirror from among the interference light detected by the interference light detecting means 6, only the interference light based on the reflected light reflected from the indented measuring region is securely detected. Thus, the image with a greater S/N ratio having less noise may be obtained compared with the image obtained by the conventional confocal microscope apparatus.

It should be appreciated that the embodiment of the present invention is not limited to the aforementioned embodiment. For example, in the confocal microscope apparatus 1 shown in FIG. 1, the light L, measuring light L1, reference light L2, reflected light L3, and interference light L4 are propagated through the optical fibers as an example case, but they may be propagated through the air or vacuum.

What is claimed is:

1. A confocal microscope apparatus for obtaining an image of a measuring object at a predetermined depth, comprising:
   a light source unit for outputting light;
   a light splitting means for splitting the light outputted from the light source unit into measuring light and reference light;
   a light modulating section for producing a frequency difference between the measuring light and reference light split by the light splitting means;
   an optical fiber section comprised of a multicore optical fiber having a plurality of cores;
   a core selection means for selecting a core of the plurality of cores for guiding the measuring light;
   a synchronization control means for controlling the light modulating section and the core selection means in synchronization;
   a confocal optical system for focusing the measuring light split by the light splitting means on the measuring object, and focusing reflected light reflected from the measuring object when the measuring light is focused thereon;
   a light combining means for combining the reflected light focused by the confocal optical system with the reference light;
   an interference light detecting means for detecting interference light produced when the reflected light and reference light combined by the light combining means interfere with each other; and
   an image obtaining means for obtaining an image of the measuring object at a predetermined depth based on the interference light detected by the interference light detecting means,
   wherein the light modulating section comprises:
   a diffraction grating element for dispersing the reference light split by the light splitting means;
   a collimator lens for collimating the reference light dispersed by the diffraction grating element;
   a reflection mirror for reflecting the reference light transmitted through the collimator lens back to the collimator lens and inputting to the diffraction grating element, the reflection mirror pivoting on a position which is offset from the optical axis of the collimator lens; and
   a mirror for reflecting the reference light inputted to the diffraction grating element by the reflection mirror and dispersed from the diffraction grating element back to the diffraction grating element,
   wherein the reflection mirror is pivoted on the position that satisfies the relationship represented by the formula, $x = I_f \lambda_0 / p$, where: $\lambda_0$ is the wavelength of the reference light; $I_f$ is the distance between the collimator lens and the reflection mirror; p is the pitch of the diffraction grating element; and x is the offset distance between the optical axis of the collimator lens and the pivot center when the reflection mirror is pivoted.

2. The confocal microscope apparatus according to claim 1, wherein:
   the reflection mirror is pivoted at a constant speed; and
   the image obtaining means includes a bandpass filter for passing only a signal having a frequency of the interference light determined by the pivoting speed of the reflection mirror in the interference light detected by the interference light detecting means.

3. The confocal microscope apparatus according to claim 1, wherein:
   the synchronization control means controls the light modulating section and the core selection means such that the pivoting of the reflection mirror and the selection of the core by the core selection means are scanned in synchronization.

4. The confocal microscope apparatus according to claim 3, wherein:
   the synchronization control means further controls the light modulating section and the core selection means such that while the reflecting mirror is tilted the core selection means scans the selected core in a direction corresponding to the offset distance, x.

* * * * *